United States Patent [19]

Jacobs

[11] 3,748,643

[45] July 24, 1973

[54] INERTIALLY-ACTUATED TAILLIGHT SYSTEM
[75] Inventor: James W. Jacobs, Dayton, Ohio
[73] Assignee: General Motors Corporation, Detroit, Mich.
[22] Filed: Aug. 23, 1971
[21] Appl. No.: 173,915

[52] U.S. Cl............ 340/71, 116/42, 240/8.3, 340/66, 340/122, 340/262
[51] Int. Cl............................................. B60q 1/44
[58] Field of Search ............... 340/71, 72; 116/28, 116/35–38, 42–45, 50, 56; 240/46.03, 46.05

[56] References Cited
UNITED STATES PATENTS

| 1,330,562 | 2/1920 | Wakefield | 116/42 |
| 2,249,785 | 7/1941 | Roper et al. | 240/46.03 |
| 1,786,518 | 12/1930 | Chambers | 240/46.05 X |
| 1,863,688 | 6/1932 | Delmas | 116/42 |
| 3,296,998 | 1/1967 | Kirk | 116/28 R |

FOREIGN PATENTS OR APPLICATIONS

| 577,281 | 6/1924 | France | 240/46.03 |
| 1,014,504 | 12/1965 | Great Britain | 340/71 |

Primary Examiner—John W. Caldwell
Assistant Examiner—Kenneth N. Leimer
Attorney—J. L. Carpenter and Paul Fitzpatrick

[57] ABSTRACT

Vehicle taillight apparatus for indicating changes in vehicle speed. The taillight assembly includes a continuously energized lamp and first and second lenses fixedly secured to the vehicle so the lenses transmit light from the lamp rearwardly of the vehicle. A screen assembly including a first screen having a central aperture and a second screen having colored sections is slidably positioned between the lamp and the first lens so only light passing through the aperture strikes the first lens and only light passing through a colored section strikes the second lens. The screen assembly is biased to a certain position so inertial forces on the screen assembly due to vehicle acceleration and deceleration move the screen sufficient to vary the amount of light emanating from the first lens and the color of light emanating from the second lens. The taillight assembly also includes a brake switch actuated electromagnet for moving the screen assembly to a position indicative of maximum deceleration whenever the vehicle brakes are applied.

3 Claims, 9 Drawing Figures

Patented July 24, 1973 3,748,643
2 Sheets-Sheet 1
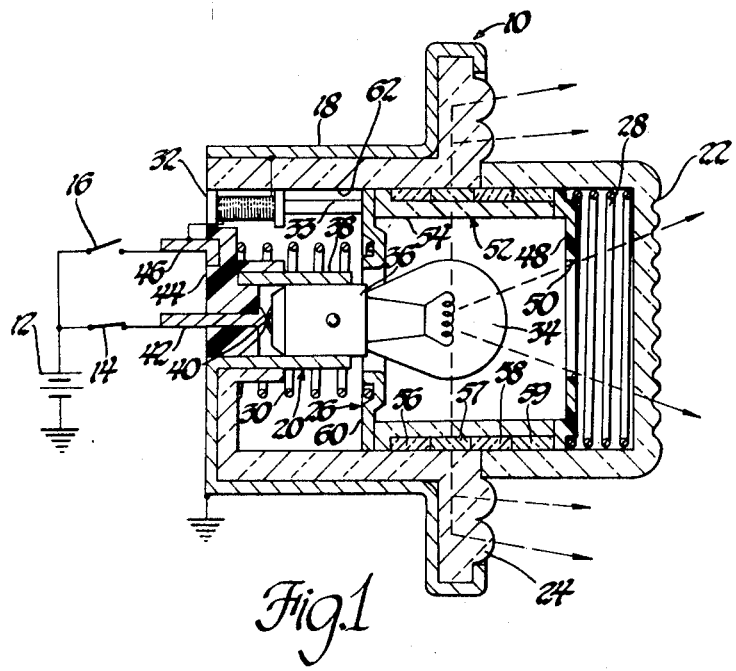
Fig.1
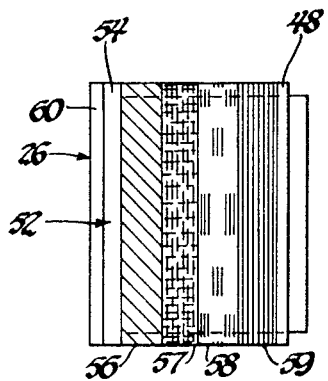
Fig.2
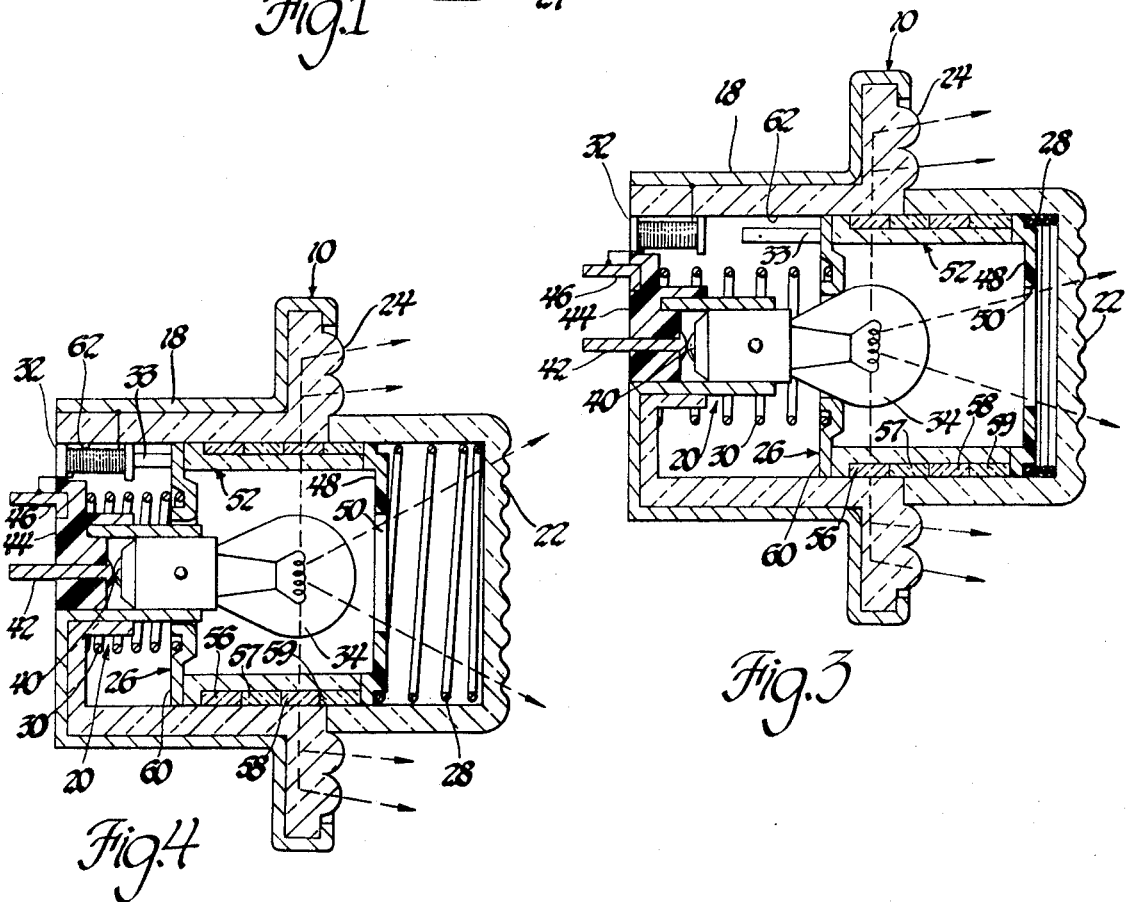
Fig.4
Fig.3
INVENTOR.
James W. Jacobs
BY
Paul Fitzpatrick
ATTORNEY Patented July 24, 1973 3,748,643

INVENTOR.
James W. Jacobs
BY
Paul Fitzpatrick
ATTORNEY

INERTIALLY-ACTUATED TAILLIGHT SYSTEM

This invention relates to vehicle taillight systems and, more particularly, to taillight apparatus which provides the function of a continuously energized taillight and which also indicates speed changes of the vehicle to which the taillight apparatus is attached.

Most modern automobiles have taillights which are continuously energized so as to indicate the presence of a vehicle in darkness and to provide increased light intensity when the vehicle is being braked, which advises following motorists of the vehicle deceleration. While various other vehicle taillight systems have been proposed in which speed changes of the vehicle are indicated to following motorists regardless of whether the vehicle brakes are applied, these other systems have not gained widespread acceptance. The reason for this situation is thought to be that, while under certain circumstances it would be to the advantage of motorists following a vehicle to be advised of speed changes in the vehicle, following motorists who are unfamiliar with the signalling system of the vehicle in question may be confused by such a system. Since this element of possible confusion has been felt to outweigh the advantages of such a signalling system, the future use of such systems remains unforeseeable and the search for such a system which would minimize the possibility of driver confusion continues. Before progressing further with this description it should be noted that the terms acceleration and deceleration it contains refer to a time rate of change in the forward speed of a vehicle. Of course, persons versed in the art will appreciate that deceleration is actually negative acceleration and vice versa.

It is, therefore, an object of this invention to provide taillight apparatus which indicates speed changes of a vehicle by varying the illuminated area of a lens which is continuously illuminated by a lamp.

It is also an object of this invention to provide taillight apparatus for indicating changes in the speed of a vehicle by movement of an acceleration responsive multiple colored screen between a lens and a continuously energized lamp in response to vehicle speed changes.

It is an additional object of this invention to provide a taillight assembly which incorporates continuously illuminated taillight lenses and which both varies the illuminated area of a first lens and also varies the color of light emanating from a second lens as an indication of vehicle speed changes.

It is yet another object of this invention to provide a taillight assembly in which an acceleration responsive element effects an indication of vehicle speed changes and in which apparatus responsive to application of the vehicle brakes causes the acceleration responsive element to effect an indication of maximum deceleration of the vehicle regardless of actual deceleration of the vehicle whenever the vehicle brakes are applied.

It is yet a further object of this invention to provide a vehicle taillight assembly in which a single lamp is continuously energized to effect illumination of inner and outer concentric lenses of different diameters, the illuminated area of the inner lens and the color of light illuminating the outer lens being varied to indicate speed changes of the vehicle.

The foregoing and other objects and advantages of the subject invention will become apparent from the accompanying description and drawings, in which:

FIG. 1 is a sectional view of vehicle taillight apparatus incorporating the principles of the subject invention;

FIG. 2 is a plan view of an acceleration responsive element incorporated in the apparatus of FIG. 1;

FIGS. 3 through 5 are sectional views of the taillight assembly disclosed in FIG. 1 under various conditions of acceleration.

Figure 5:
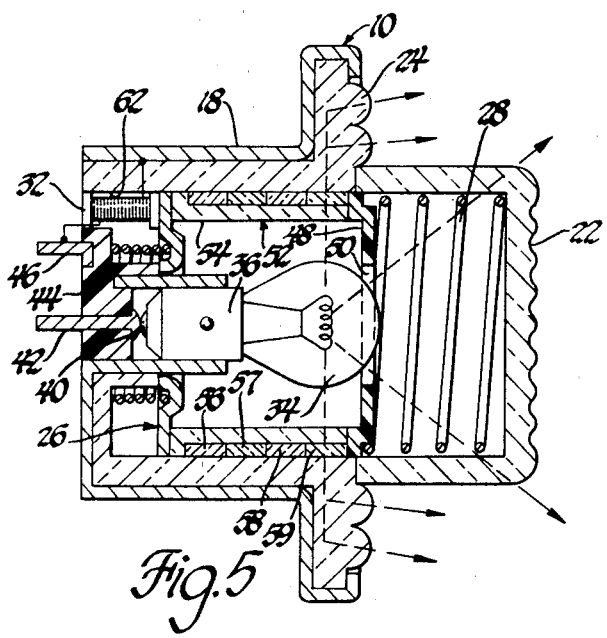

As shown in FIG. 1, vehicle taillight apparatus according to the principles of the subject invention includes a taillight assembly 10, a power source, such as a vehicle battery 12, a switch 14 for energizing the taillight assembly 10, and a brake switch 16 for controlling the indications provided by the taillight assembly 10 in accordance with application of the vehicle brakes. Persons versed in the art will appreciate that many diverse and well-known types of switches may be employed as the switches 14 and 16 so they are only schematically illustrated for purposes of this description. By way of example, and without limitation, the brake switch 16 may be a conventional normally open brake switch that is closed when the vehicle brakes are applied and the switch 14 may be included in a multiple pole, multiple throw switch employed to control energization of the vehicle's ignition system. When so employed the switch 14 would be closed whenever the vehicle is in operation.

In the illustrated embodiment the taillight assembly 10 includes an electrically grounded housing 18 which is connected to the vehicle (not shown) and supports a lamp assembly 20 for generating light. The taillight assembly 10 also includes first and second concentric lenses 22 and 24 for transmitting light from the lamp assembly 20 rearward of the vehicle, an acceleration responsive screen assembly 26 for detecting speed changes of the vehicle and for controlling the illumination of the lenses 22 and 24 by the lamp assembly 20 in accordance with vehicle speed changes, first and second springs 28 and 30 for biasing the screen assembly 26 to a certain position when the vehicle is not undergoing acceleration, and a solenoid 32 having a magnetic core 33 for controlling the position of the screen assembly 26 when application of the vehicle brakes (not shown) effects closure of the normally open brake switch 16.

In the illustrated embodiment the lamp assembly 20 includes a lamp 34 having a metal base 36 that is positioned within a socket 38 formed in the housing 18. Accordingly, the base 36 serves as an electrically grounded contact of the lamp 34 while a second contact 40 of the lamp 34 is electrically connected to the battery 12 through a pin 42 and the ignition switch 14. The pin 42 is electrically isolated from the housing 18 by an insulating grommet 44 that also isolates a second pin 46 from the housing 18, the second pin 46 serving as an electrical terminal for connection of the solenoid 32 to the battery 12 through the brake switch 16. The magnetic core 33 of the solenoid 32 is secured to the screen assembly 26, as through use of an adhesive, for purposes soon to be described. Since the lamp 34 is connected to the battery 12 whenever the ignition switch 14 is closed the lamp 34 serves as a taillight whenever the vehicle is in operation and the light which it generates illuminates the lenses 22 and 24 through the screen assembly 26.

The screen assembly 26, as shown in FIGS. 1 and 2, includes a first screen 48 of an opaque material defining an aperture 50 through which light passes from the lamp 34 to the first lens 22. The screen assembly 26 also includes a second screen 52 for controlling the color of light entering the second lens 24 from the lamp 34. The second screen 52 includes a substantially cylindrical support member 54 of a transparent material on which are disposed cylindrical sections 56 through 59 of colored translucent material, the colors of which will subsequently be described. The screen assembly 26 also includes a spring retainer 60 for retaining the second spring 30 in a position concentric with the lamp 34 and for supporting the magnetic core 33. The first screen 48 serves as a spring retainer for the first spring 28 which, together with the second spring 30, biases the screen assembly 26 to a certain position within the cylindrical bore 62 that is formed by the lenses 22 and 24. Accordingly, the position of the screen assembly 26 within the bore 62 is determined by the compressive forces in the springs 28 and 30, which forces vary as the vehicle accelerates and decelerates.

As persons versed in the art will appreciate, the inertia of the screen assembly 26 causes it to resist changes in its speed. Since it may be assumed that friction within the bore 62 is negligible, the acceleration of the housing 10 and the screen assembly 26 can only be equal when the forces in the springs 28 and 30 are unbalanced sufficiently to accelerate the screen assembly 26 at the same rate as the housing 10 is accelerated by the vehicle. For purposes of this description, these unbalanced forces will be termed inertial forces since they are caused by the need to overcome the inertia of the screen assembly 26.

The operation of the subject apparatus will now be explained in conjunction with the remaining FIGS. 3–9. When the speed of the housing 18, which is rigidly attached to the vehicle, is constant, there are no inertial forces on the screen assembly 26 so it is held in the position illustrated in FIG. 1 by the springs 28 and 30. Under these conditions light from the lamp 34 shining through the aperture 50 of the first screen 48 illuminates a moderately large central portion of the first lens 22. By making the lens 22 of a red transparent or translucent material, such as the familiar materials presently used in vehicle taillights, motorists following the taillight assembly 10 will observe a red light shining from the central portion of the first lens 22.

Figure 6:
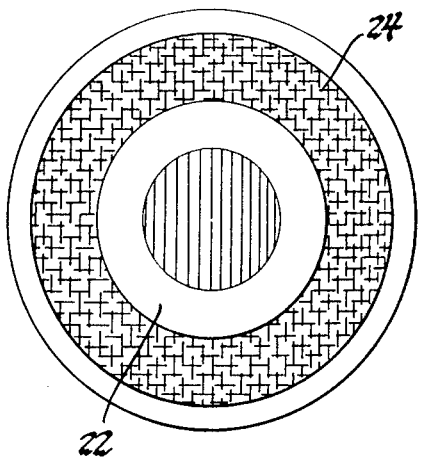
FIGS. 6 through 9 are elevation views of the lenses employed in the taillight assembly of FIG. 1 as they are illuminated when the vehicle is under various conditions of acceleration.

In addition, when the vehicle speed is constant motorists following the vehicle are able to observe light emanating from the second lens 24 after the light has passed from the lamp 34 through the support member 54 and the section 57 of the second screen 52. While the materials employed in the taillight assembly 10 need not be limited to particular colors or substances, it is contemplated in the preferred embodiment that the support member 54 and the second lens 24 are made of a clear transparent or translucent plastic and that the sections 56 through 59 of the second screen 52 are made of various colored cylindrical sections of transparent or translucent plastic, the sections 56 through 59 being colored green, yellow, red on white, and red, respectively. It is thus apparent that the color of light emanating from the second lens 24 will be the same as the color of the plastic through which it passes on the second screen 52. Accordingly, when the vehicle speed is constant the light which emanates from the second lens 24 is yellow in color due to its passage through the yellow section 57 of the second screen 52. Motorists following the taillight assembly 10 under these conditions thus view the taillight assembly 10 as being a moderately large red circle of light within a surrounding ring of yellow light, as shown in FIG. 6.

Figure 7:
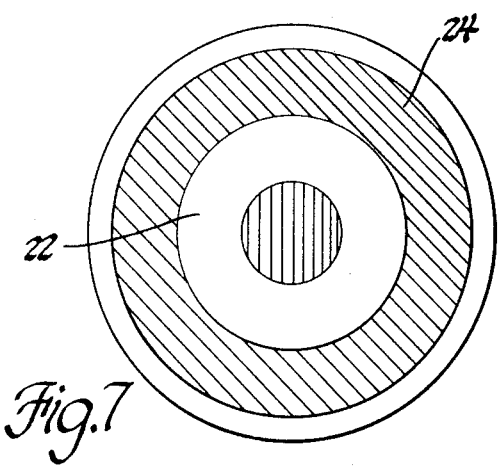

Should the vehicle carrying the taillight assembly 10 be accelerated in a forward direction the resulting inertial forces on the screen assembly 26 cause it to shift rearwardly in the bore 62, as shown in FIG. 3. The resulting translation of the screen assembly 26 relative to the lamp 34 and the first lens 22 causes a decrease in the area of the first lens 22 which is exposed to the lamp 34 through the aperture 50. In addition, the movement of the second screen 52 when the vehicle is accelerated aligns the green section 56 of the second screen 52 with the lamp 34 and the second lens 24 so that light emanating from the second lens 24 is green in color. Accordingly, when the vehicle is accelerating following motorists view the taillight assembly 10 as a relatively small red circle of light surrounded by a green ring of light, as shown in FIG. 7.

Figure 8:
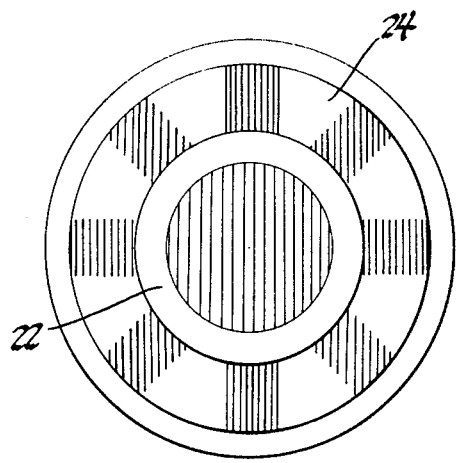

Should the vehicle be decelerated at a moderate rate without applying the vehicle brakes, as may be effected merely by releasing the vehicle accelerator, the resulting inertial forces on the screen assembly 26 cause it to shift forward, as shown in FIG. 4. Under these conditions the aperture 50 in the first screen 48 exposes a greater than normal amount of the first lens 22 to the lamp 34 and the red on white section 58 of the second screen 52 is aligned with the lamp 34 and the second lens 24. Accordingly, motorists following the taillight assembly 10 under these conditions view the taillight assembly 10 as being a large red circle surrounded by a ring of light having red and white sections substantially as illustrated in FIG. 8. It should also be noted that, by arranging the red and white portions of the red on white section 58 as illustrated in FIG. 2, minor variations in the vehicle deceleration rate will so change the inertial forces on the screen assembly 26 and vary the portion of the section 58 through which light passes to the second lens 24 as to effect a flashing of the red and white areas of light emanating from the second lens 24. This flashing light further serves to advise following motorists that the vehicle equipped with the taillight assembly 10 is being decelerated.

Figure 9:
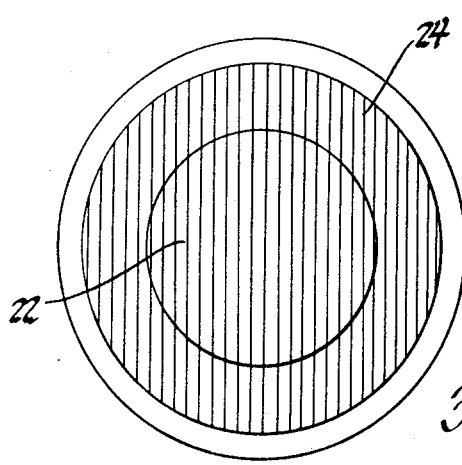

Should the vehicle equipped with the taillight assembly 10 be rapidly decelerated without application of the vehicle brakes, such as during a deceleration caused by downshifting the vehicle transmission, the increased inertial forces on the screen assembly 26 cause it to shift to its forwardmost position relative to the housing 18, as shown in FIG. 5. Under these conditions the first screen 48 is shifted so far forward as to expose the entire end surface of the first lens 22 to the lamp 34 through the aperture 50. In addition, the rapid deceleration of the vehicle causes the red section 59 of the second screen 52 to be aligned with the lamp 34 and the second lens 24 so that light emanating from the second lens 24 is red in color. Accordingly, when the vehicle is rapidly decelerated the taillight assembly 10 appears to following motorists as a single very large red light inasmuch as the light from each of the lenses 22 and 24 is red in color, as shown in FIG. 9.

Since the rate of deceleration of the vehicle equipped with the taillight assembly 10 may be rapidly increased while the vehicle brakes are applied merely by increasing pressure on the vehicle brake pedal, it is believed desirable that following motorists be given the same information whenever the vehicle is being braked as they are given when the vehicle's deceleration rate is at a maximum. Accordingly, whenever the vehicle is being braked the brake switch 16 is closed so as to energize the solenoid 32. Upon energization of the solenoid 32 the magnetic core 33, which is secured to the screen assembly 26, is drawn into the solenoid 32, as shown in FIG. 5, so long as the brake switch 16 is closed. Accordingly, whenever the brakes of the vehicle are applied the screen assembly 26 is shifted to the same position it assumes when the vehicle is undergoing maximum rates of deceleration, as portrayed in FIG 5. Motorists following the vehicle thus view the taillight assembly 10 as a single large red light, shown in FIG. 9, whenever the vehicle brakes are applied regardless of the actual vehicle deceleration.

While the foregoing description has been directed toward operation of the vehicle in a forward direction, persons versed in the art will appreciate that the taillight assembly 10 is also responsive to acceleration and deceleration of the vehicle in a rearward direction. For example, when the vehicle accelerates in a rearward direction the resulting inertial forces on the screen assembly 26 shift it in a forward direction so as to provide the aforedescribed full red indication of FIG. 9 or the flashing indication of FIG. 8, depending on the rate of acceleration. Similarly, rearward deceleration will cause the display presented in FIG. 7.

Though the foregoing description has been directed toward the illustrated and preferred embodiment of the subject invention, persons versed in the art will appreciate that various modifications of this invention may be made without departing from its spirit.

What is claimed is:

1. Apparatus for indicating changes in the speed of a vehicle comprising, in combination, a light source for generating light, first and second lenses for receiving and transmitting light emanating from the light source, an opaque screen having an aperture positioned between the light source and the first lens for limiting the area of the first lens exposed to light emanating from the light source, a second screen positioned between the light source and the second lens, the second screen having a plurality of diverse colored substantially transparent sections and being adapted for translational movement so as to selectively align each of the sections with the light source and the second lens as the screen is moved, and means for moving the screens relative to the light source in response to changes in the speed of the vehicle whereby the area of the first lens that is exposed to light from the light source and the color of the screen section that is positioned between the light source and the second lens are varied in response to acceleration and deceleration of the vehicle, the area of light emanating from the first lens and the color of light emanating from the second lens thereby indicating whether the vehicle speed is constant, increasing, or decreasing.

2. Vehicle taillight apparatus comprising, in combination, a lamp rigidly secured to the rear of the vehicle for continuously generating light, a first lens fixedly positioned relative to and rearward of the lamp effective to transmit light from the lamp rearward of the vehicle, an opaque screen having an aperture movably positioned between the lamp and the first lens for varying the area of the first lens exposed to light from the lamp, a second lens positioned proximate the first lens and effective to transmit light from the lamp rearward of the vehicle, a second screen positioned between the lamp and the second lens, the second screen being adapted for translational movement and having a plurality of light transmitting sections of diverse colors, means for biasing the first and second screens to respective predetermined positions when the vehicle speed is constant so as to expose a certain area of the first lens to light from the lamp and to align a predetermined section of the second screen with the lamp and the second lens, and means responsive to acceleration and deceleration of the vehicle for effecting translation of the first screen relative to the lamp and the first lens so as to vary the area of the first lens exposed to light from the lamp in response to vehicle speed changes and effecting translation of the second screen so as to change the section of the second screen that is aligned with the lamp and the second lens in response to vehicle speed changes whereby both the color of light transmitted rearward of the vehicle by the second lens and the area of the first lens that transmits light rearward of the vehicle are varied in response to speed changes of the vehicle.

3. A vehicle taillight assembly for indicating acceleration, deceleration, and braking of the vehicle comprising, in combination, a lamp fixedly attached to the vehicle for continuously generating light, a first lens of a certain color fixedly positioned relative to the lamp and oriented to receive light from the lamp and to transmit light of the certain color rearwardly of the vehicle, a screen having an aperture positioned between the lamp and the lens for limiting the area of the first lens exposed to light from the lamp to that area which is aligned with the aperture and the lamp, the screen being adapted for movement between the lens and the lamp, biasing means for biasing the screen to a certain position when the vehicle speed is constant and for effecting translation of the screen between the lamp and the first lens when the speed of the vehicle is being changed, the inertia of the screen when the vehicle decelerates moving the screen toward the lamp so as to increase said area and, when the vehicle accelerates, moving the screen toward the first lens so as to decrease said area, said area and the amount of light transmitted by the first lens thereby being varied in response to acceleration and deceleration of the vehicle, a substantially annular lens positioned so as to substantially surround and be concentric with the first lens to receive light from the lamp and to transmit light rearwardly of the vehicle, a substantially cylindrical screen having a plurality of colored light transmitting substantially cylindrical sections positioned between the annular lens and the lamp, the sections each being selectively alignable with the lamp and the annular lens so that light from the lamp passes through one of the sections to the annular lens, means for securing the cylindrical screen to the apertured screen for translational movement therewith so as to vary the color of light entering the annular lens in response to acceleration and deceleration of the vehicle whereby light entering the annular lens from the lamp passes through a certain section of the cylindrical screen when the speed of the vehicle is constant, through a section forward of the certain section when the vehicle is accelerating, and through a section rearward of the certain section when the vehicle is decelerating, and means responsive to application of the vehicle brakes for indicating deceleration of the vehicle by moving the screens to their forwardmost position when the vehicle brakes are applied regardles

PO-1050
(5/69)

UNITED STATES PATENT OFFICE
CERTIFICATE OF CORRECTION

Patent No. 3,748,643                    Dated  July 24, 1973

Inventor(s) James W. Jacobs

It is certified that error appears in the above-identified patent and that said Letters Patent are hereby corrected as shown below:

Column 8, line 4, "regardles" should be deleted and substituted therefor -- regardless of actual speed changes of the vehicle, thereby increasing said area to a maximum and aligning a section rearward of the certain section with the lamp and the annular lens whenever the vehicle brakes are applied. --

Signed and sealed this 19th day of March 1974.

(SEAL)
Attest:

EDWARD M. FLETCHER, JR.                C. MARSHALL DANN
Attesting Officer                       Commissioner of Patents